(12) United States Patent
Blount

(10) Patent No.: US 8,137,723 B1
(45) Date of Patent: Mar. 20, 2012

(54) HEALTHY COOKWARE

(76) Inventor: Daniel Ray Blount, Sulphur Springs, TX (US)

( * ) Notice: Subject to any disclaimer, the term of this patent is extended or adjusted under 35 U.S.C. 154(b) by 528 days.

(21) Appl. No.: 12/380,034

(22) Filed: Feb. 23, 2009

Related U.S. Application Data

(60) Provisional application No. 61/067,073, filed on Feb. 25, 2008.

(51) Int. Cl.
*A47J 37/07* (2006.01)

(52) U.S. Cl. .............. 426/523; 99/444; 99/450

(58) Field of Classification Search ......... 99/422, 99/425, 444–446, 450; 426/523
See application file for complete search history.

(56) References Cited

U.S. PATENT DOCUMENTS

| | | | | |
|---|---|---|---|---|
| 92,008 A * | 6/1869 | Browne | ................. | 99/444 |
| 264,867 A * | 9/1882 | Ege | ................. | 99/445 |
| 303,598 A * | 8/1884 | Tuttle | ................. | 99/450 |
| 640,030 A * | 12/1899 | Rietzke | ................. | 99/445 |
| 1,216,973 A * | 2/1917 | Epprecht | ................. | 99/425 |
| 1,469,508 A * | 10/1923 | Gosselin | ................. | 99/425 |
| 1,885,325 A * | 11/1932 | Bogley | ................. | 99/446 |
| 2,227,608 A * | 1/1941 | Tinnerman | ................. | 99/446 |
| 2,229,518 A * | 1/1941 | Parker | ................. | 99/425 |
| 2,652,766 A * | 9/1953 | Cralle | ................. | 99/450 |
| 3,322,060 A * | 5/1967 | Gilbert | ................. | 99/450 |
| 3,357,342 A * | 12/1967 | Dreyfus | ................. | 99/450 |
| 3,722,402 A * | 3/1973 | Plumley | ................. | 99/450 |
| 3,786,741 A * | 1/1974 | Plumley et al. | ................. | 99/450 |
| 3,937,138 A * | 2/1976 | Tidwell | ................. | 99/450 |
| 4,011,431 A * | 3/1977 | Levin | ................. | 99/446 |
| D248,815 S * | 8/1978 | Mizoguchi | ................. | D7/409 |
| 4,176,591 A | 12/1979 | Power | | |
| 4,428,281 A * | 1/1984 | Miller | ................. | 99/445 |
| 4,510,855 A | 4/1985 | Avner | | |
| 4,566,429 A * | 1/1986 | Williams | ................. | 99/450 |
| 4,676,151 A * | 6/1987 | Gorsuch et al. | ................. | 99/450 |
| 4,714,012 A * | 12/1987 | Hernandez | ................. | 99/444 |
| 4,727,853 A * | 3/1988 | Stephen et al. | ................. | 99/444 |
| 4,773,319 A * | 9/1988 | Holland | ................. | 99/446 |
| 4,979,440 A * | 12/1990 | Latour et al. | ................. | 99/445 |
| 5,445,066 A * | 8/1995 | Rosset | ................. | 99/446 |
| RE35,998 E * | 12/1998 | Goto | ................. | 99/446 |
| 5,974,953 A | 11/1999 | Messerli | | |
| 5,983,786 A | 11/1999 | Brown | | |
| 6,000,319 A * | 12/1999 | Treiber | ................. | 99/450 |
| 6,035,767 A * | 3/2000 | Gibson | ................. | 99/450 |
| 6,092,520 A * | 7/2000 | Hasegawa | ................. | 126/390.1 |
| 6,523,460 B1 * | 2/2003 | Lange | ................. | 99/450 |
| 6,701,829 B2 * | 3/2004 | Farrow | ................. | 99/450 |
| 7,066,169 B2 * | 6/2006 | Feldewerth et al. | ................. | 99/450 |
| 7,340,994 B2 | 3/2008 | Bruno | | |
| 2001/0023641 A1 * | 9/2001 | Borner | ................. | 99/446 |
| 2005/0204931 A1 * | 9/2005 | Cheng | ................. | 99/422 |
| 2008/0017048 A1 * | 1/2008 | Donnellan | ................. | 99/425 |

* cited by examiner

*Primary Examiner* — Stephen F Gerrity

(57) ABSTRACT

A cast-iron cookware apparatus for cooking, or more particularly, "pan"searing meat on a typical charcoal or gas grill is provided. If used in conjunction with a grease catch pan the apparatus can be used in an oven. The cookware apparatus is similar to a typical griddle, skillet, or various other pan type cookware apparatuses. The second embodiment apparatus could be used in place of a typical grill rack. The cookware apparatus has a plurality of substantially small apertures extending through the cooking area of the apparatus. Due to the size and low number of apertures the apparatus will allow most of the fat to drain from the apparatus during the cooking process, yet the apparatus still leaves the meat juicy, tender and flavorful. The apparatus reduces carcinogens produced when grill cooking, as well as reduces retained fat content when used in an oven.

1 Claim, 5 Drawing Sheets

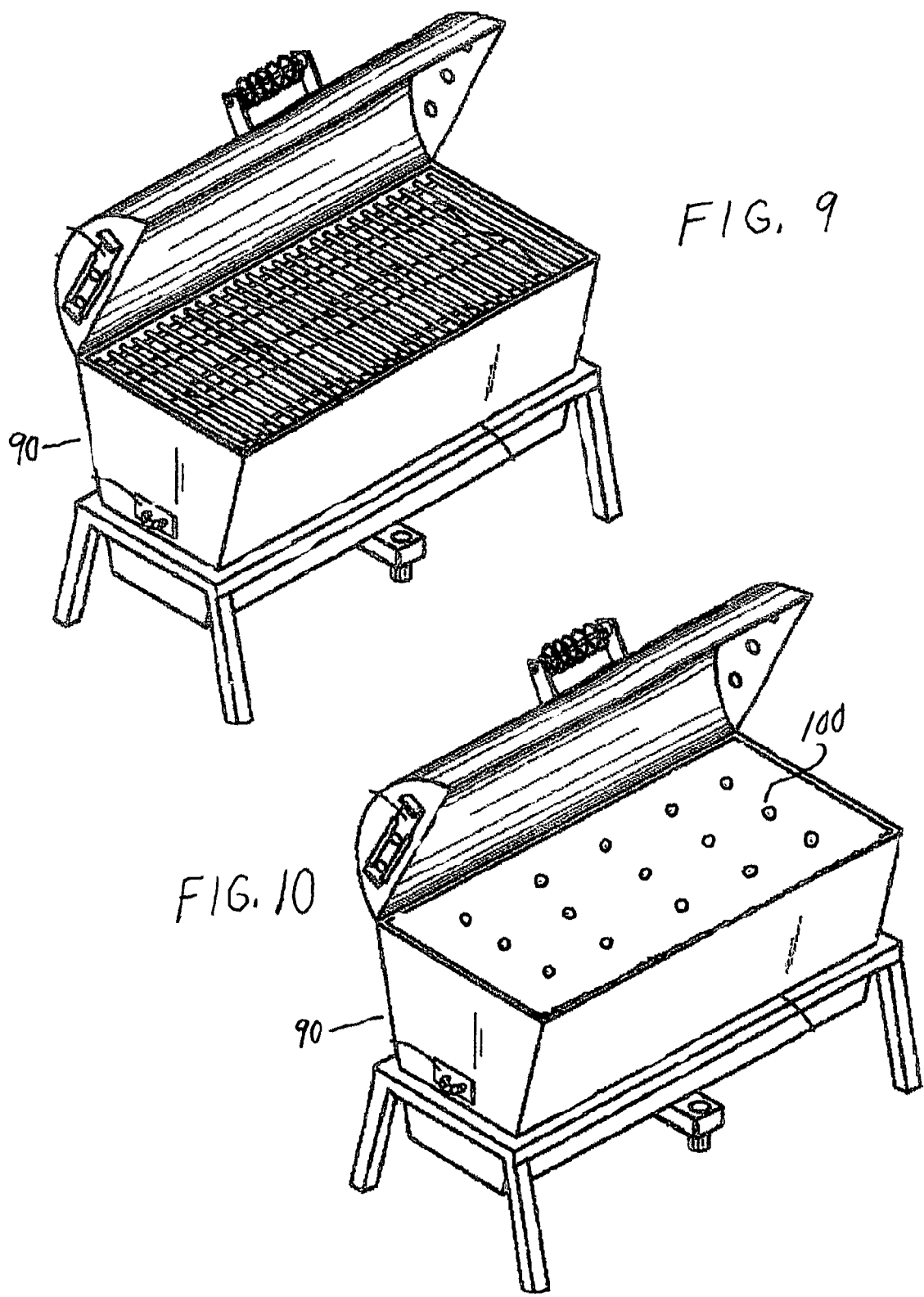

HEALTHY COOKWARE

CROSS REFERENCE TO RELATED APPLICATIONS

This application claims the benefit of provisional patent application Ser. No. 61/067,073, filed Feb. 25, 2008 by the present inventor.

FEDERALLY SPONSORED RESEARCH

Not Applicable

SEQUENCE LISTING OR PROGRAM

Not Applicable

TECHNICAL FIELD

This application relates generally to the field of cookware, and more specifically, cookware that achieves healthier cooking results than traditional cookware.

BACKGROUND OF THE INVENTION

In recent years healthy cooking has become more popular than ever. Health problems such as obesity, diabetes, cardiovascular disease, cancer, etc. have become more and more prevalent. My cookware apparatus addresses these issues by reducing produced carcinogens if used on a typical charcoal or gas grill, and by reducing fats if used with another heat source, such as an oven.

Cast-iron cookware has been very popular for well over a century. It is heavy, durable, and simply doesn't wear out. Many fine chefs use cast-iron due its ability to retain heat, as well as having uniform heat. Due to its superior heat retention, cast-iron has a greater ability than lighter weight metals to sear or brown meat. The problem with thin lightweight metals is that they quickly lose temperature when cold meat is applied, which would prevent cookware made from this type of material from searing or browning meat. An example of such cookware would be U.S. Pat. No. 7,340,994 to Bruno. The Bruno patent is manufactured from thin sheet metal. Actually the intent, or "spirit", of the Bruno patent is to cook small and delicate foods and prevent them from falling through the sheet-metal grate and into the grill. The same can be said of the following patents as well: U.S. Pat. No. 4,510,855 to Avner, U.S. Pat. No. 5,983,786 to Brown, U.S. Pat. No. 5,974,953 to Messerli. A related U.S. Pat. No. 4,176,591 to Power, is a thin sheet metal pizza pan.

Some fine restaurants cook steaks, as well as other kinds of meat, on a cast-iron griddle instead of over a fired grill. Unlike a fired grill, a griddle preserves more juices, marinades, etc., and doesn't dry out the meat like a fired grill.

On a commercial griddle, which is typically quite large, the excess fats and juices flow away, or can be pushed away with a spatula or other cooking utensil. This allows the chef to put a good sear on the meat without overcooking the middle. The problem with a typical griddle intended for home use is that it is too small to disperse the fats and juices without creating a mess or fire hazard.

Most typical skillets, and some griddles, have sides on them. Due to the fat content of most meat, by the time the cooking process is underway in a typical skillet, or on a typical griddle, you have more of a boiling effect, instead of a searing effect. The problem with this boiling effect is that it causes the meat to retain most of the unhealthy fat, which is a major contributor to obesity, as well as heart and cardiovascular disease.

Another popular way to cook meat is with a traditional charcoal or gas grill, which exposes the meat to direct heat or flame. However, this method can dry out meat by the time a good brown sear is achieved, or more particularly, by the time the meat is considered thoroughly cooked by many people.

Additionally, in recent years it has been determined that cooking on a typical charcoal or gas grill causes some meats to produce carcinogens, such as Heterocyclic amine, HCA's, and Polycyclic aromatic hydrocarbons, PAHs. A simple Internet search can produce numerous medical articles documenting the various carcinogens produced with traditional grill cooking.

SUMMARY OF THE INVENTION

In order to cook with a typical charcoal or gas grill it would be preferred to have an apparatus or method that can greatly reduce the carcinogens produced from this type of cooking. Additionally, it would be another significant benefit if the same cookware apparatus could greatly reduce the fat content from various meats, simultaneously during the cooking process, whether on a grill, or in an oven, or any other heat source.

My cast-iron cookware apparatus with substantially small apertures in the surface of the cooking area addresses both of the above issues. It can reduce carcinogens if used on a typical charcoal or gas grill. However, when used on a typical charcoal or gas grill this cooking apparatus still accomplishes the flavor associated with grill cooking. If used in an oven in conjunction with a grease catch pan it greatly reduces the fat content in meats.

The first embodiment of my apparatus is made of rigid, substantially thick, and heavy cast-iron. I anticipate this embodiment to be in the shape of a typical griddle or skillet of any size or shape. Additionally I anticipate that my apparatus could also be in the shape of any other type cookware or ovenware, of any shape or size. This embodiment has substantially small apertures in the cooking area. There is a substantially low ratio of apertures to total cooking area. I presently contemplate that the apertures will be approximately 3/16 inch in diameter and approximately two to three inches apart. With the relatively small aperture size, and relatively low ratio of small apertures to total cooking area, this apparatus greatly shields meat from direct heat or flames when used on a typical charcoal or gas grill. This greatly reduces the likelihood of carcinogens being produced. This apparatus allows most of the hot grease to drain through the surface during the cooking process. However, it doesn't allow all of the juices to drain away, which preserves the marinades.

Typical charcoal or gas grills have no limitation as to the amount of grease and marinades that are allowed to drain from the meat, which allows the meat to dry out. My apparatus, due to the small size and number of apertures, partially limits the amount of drainage so as to retain a small amount of the liquids and marinades in order to preserve the flavor and leave the meat juicy, tender, and flavorful.

When the first embodiment is used in an oven in conjunction with a grease catch pan hot grease readily flows through the apertures into the grease catch pan. This greatly reduces the retained fat content in meat and therefore produces a healthier result. Meatloaf in particular is much healthier cooked this way. When used in an oven the superior heat retention qualities of cast-iron still accomplishes a good brown sear.

My apparatus is easily and inexpensively manufactured by simply drilling small apertures into the cooking area of a typical cast-iron griddle, skillet or pan, or any other type cast-iron cookware. Another manufacturing process is to simply mold the apertures into the cooking surface of the cast-iron cookware during the casting process.

A second embodiment of my apparatus is a flat, rigid, substantially thick, and heavy cast-iron cooking surface with a similar aperture design as the first embodiment. This second embodiment is not designed to be placed on top of a typical charcoal or gas grill, or in an oven. This second embodiment is designed instead to be used in place of a typical grill rack on a typical charcoal or gas grill. The manufacturing process is similar to the first embodiment. Simply take a section of cast-iron the size and shape to fit the intended grill. Drill apertures of the approximate size of the first embodiment and with the approximate ratio of apertures to total cooking area as the first embodiment. Another manufacturing process would be to mold the apertures into the surface during the casting process. Remove the traditional grill rack from the typical charcoal or gas grill and replace with this second embodiment cooking surface.

The stated cast-iron material is what I would contemplate being the best material at this time for the present cookware apparatus. However, with manufacturing technologies changing it is possible that at sometime in the future that another material could achieve similar results, and therefore the stated cast-iron material should not be construed as limiting. Accordingly, the scope of protection is only limited by the scope of the accompanying claims.

It is therefore an object of the present invention to provide a new cookware apparatus which if used on a typical charcoal or gas grill provides many of the same advantages and tastes associated with grill cooking, while producing a significantly lower amount of carcinogens. Another objective is a cooking apparatus that "pan" sears the meat during the cooking process. Another objective of the present invention is to significantly reduce the amount of fats when the invention is used in an oven or with another heat source. Another objective of the present invention is to produce results not anticipated, rendered obvious, suggested, or even implied by any prior art cookware apparatus, either alone or in any combination thereof. And finally, I anticipate that this new apparatus achieves important, significant, and valuable, unexpected new results.

BRIEF DESCRIPTION OF THE DRAWINGS

FIG. 9 is a perspective view of a typical charcoal or gas grill.

FIG. 10 is a perspective view of a typical charcoal or gas grill according to the present invention.

DETAILED DESCRIPTION

FIGS. 1, 3, 5, and 7 illustrate typical traditional cookware apparatuses prior to the novel features of the present invention. FIG. 9 illustrates a typical traditional charcoal or gas grill prior to the novel features of the present invention.

FIGS. 2, 4, 6, and 8 are clear visual representations of the main embodiment of the present invention. FIG. 10 illustrates the second embodiment according to the present invention. I would expect that one of ordinary skill in the art could easily understand and manufacture any of the versions based on the following visual descriptions.

Figure 1:
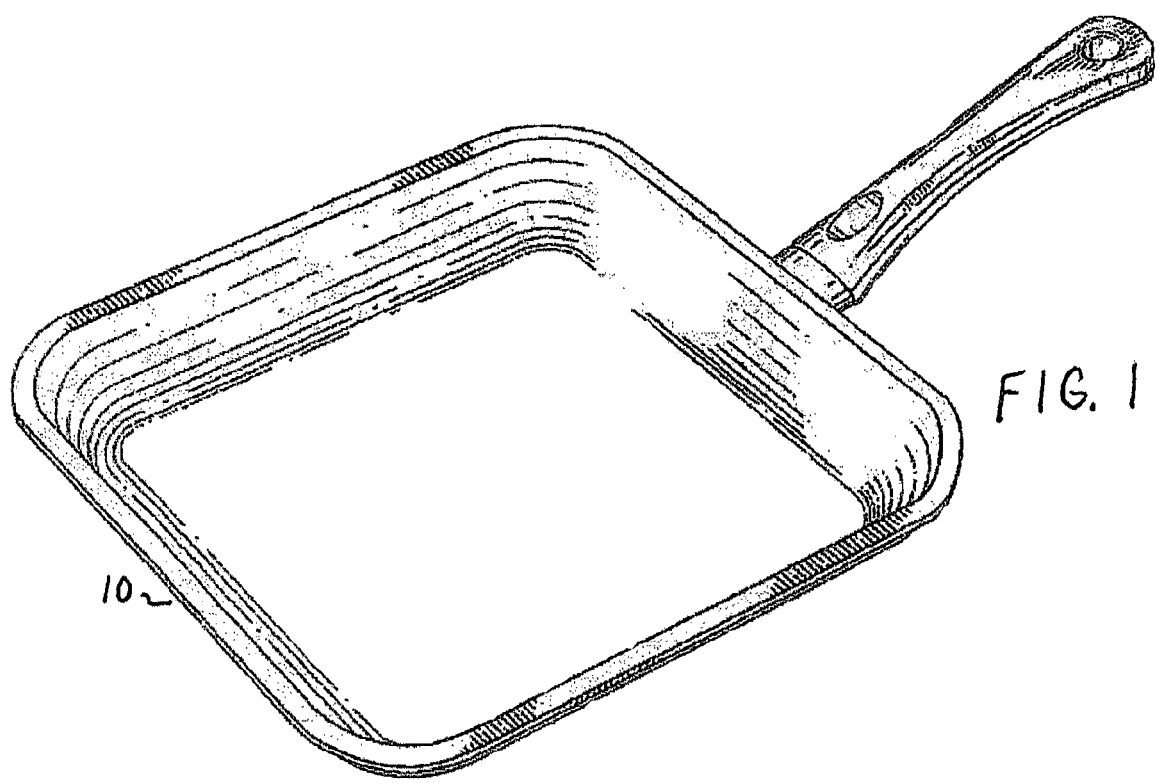
FIG. 1 is a perspective view of a typical cast-iron griddle pan.
Figure 2:
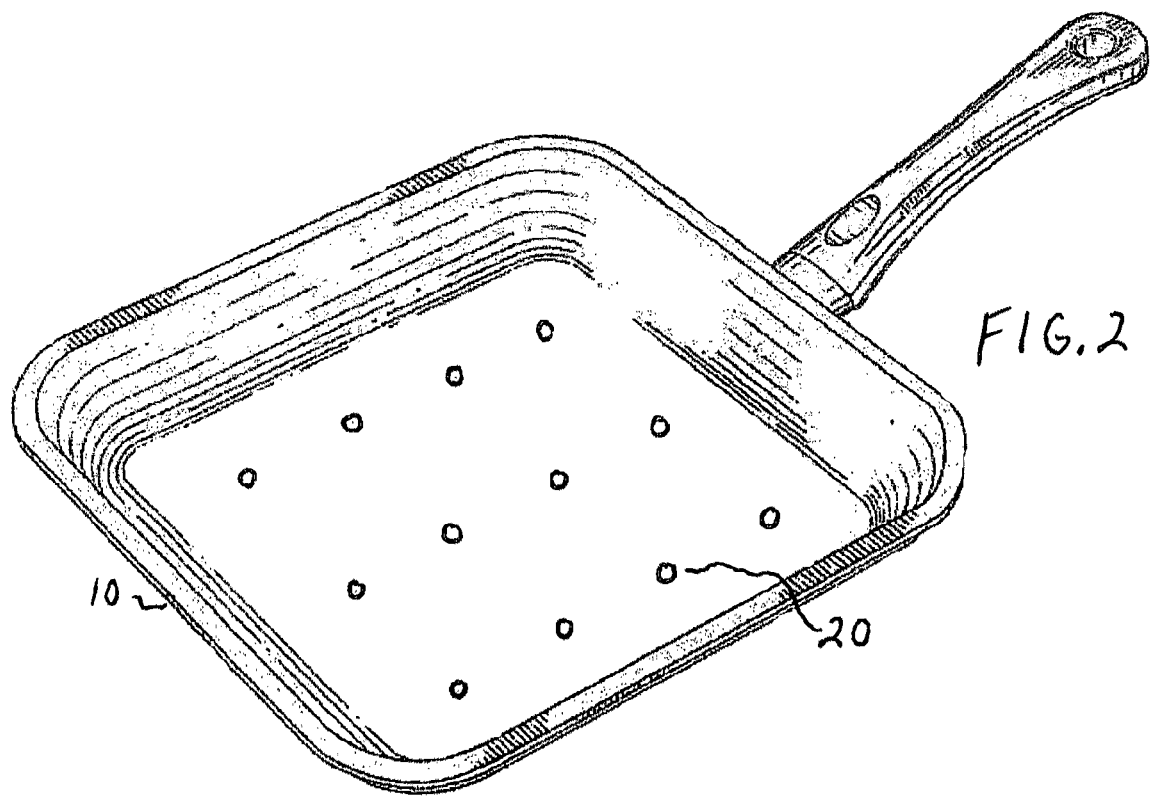
FIG. 2 is a perspective view of a typical cast iron griddle pan according to the present invention.
Figure 3:
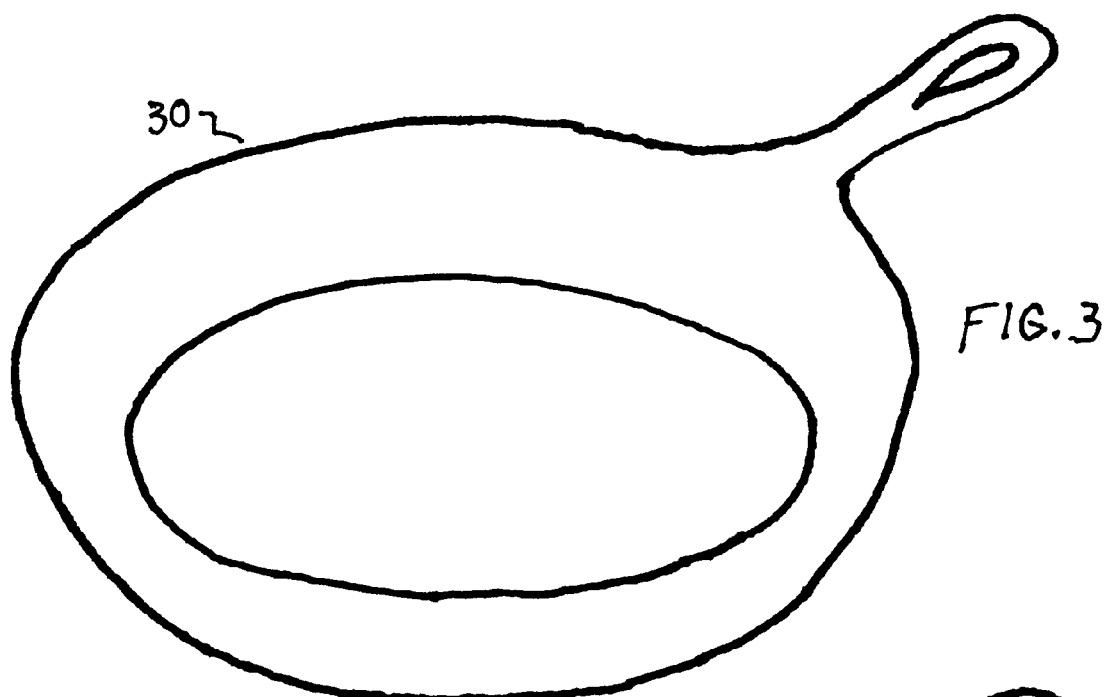
FIG. 3 is a perspective view of a typical cast-iron skillet.
Figure 4:
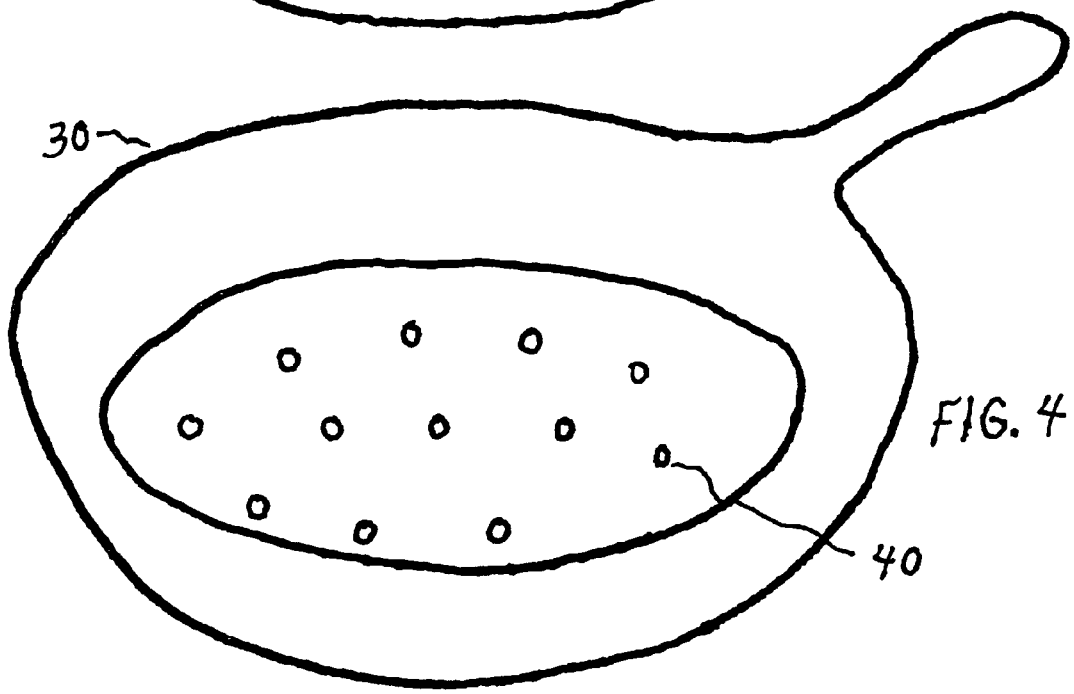
FIG. 4 is a perspective view of a typical cast-iron skillet according to the present invention.
Figure 5:
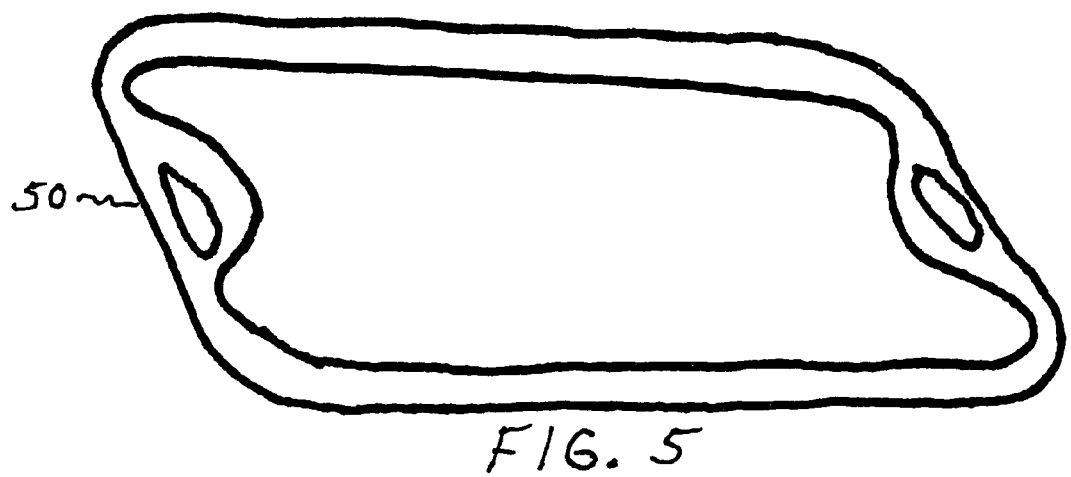
FIG. 5 is a perspective view of a typical cast-iron flat griddle.
Figure 6:
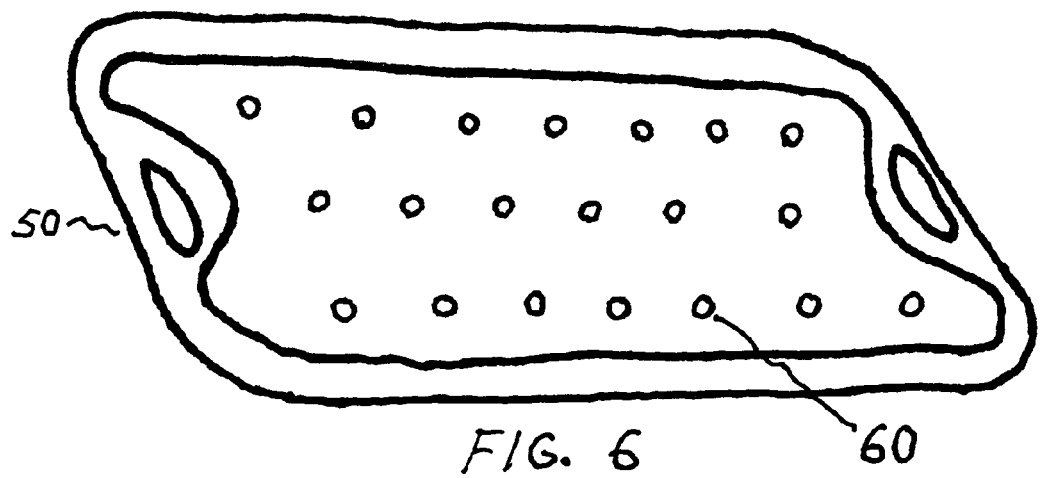
FIG. 6 is a perspective view of a typical cast-iron flat griddle according to the present invention.
Figure 7:
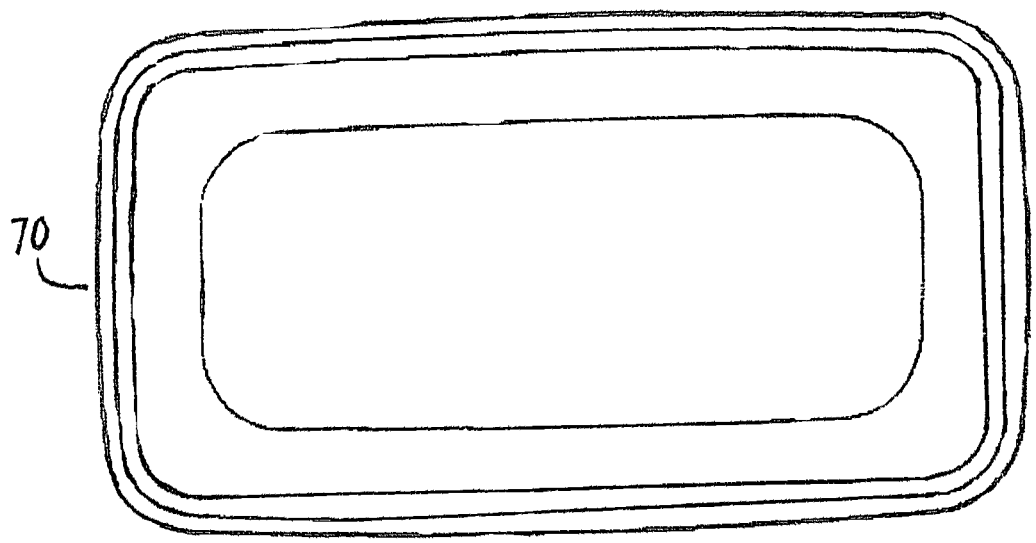
FIG. 7 is a top view of a typical cast-iron loaf pan.
Figure 8:
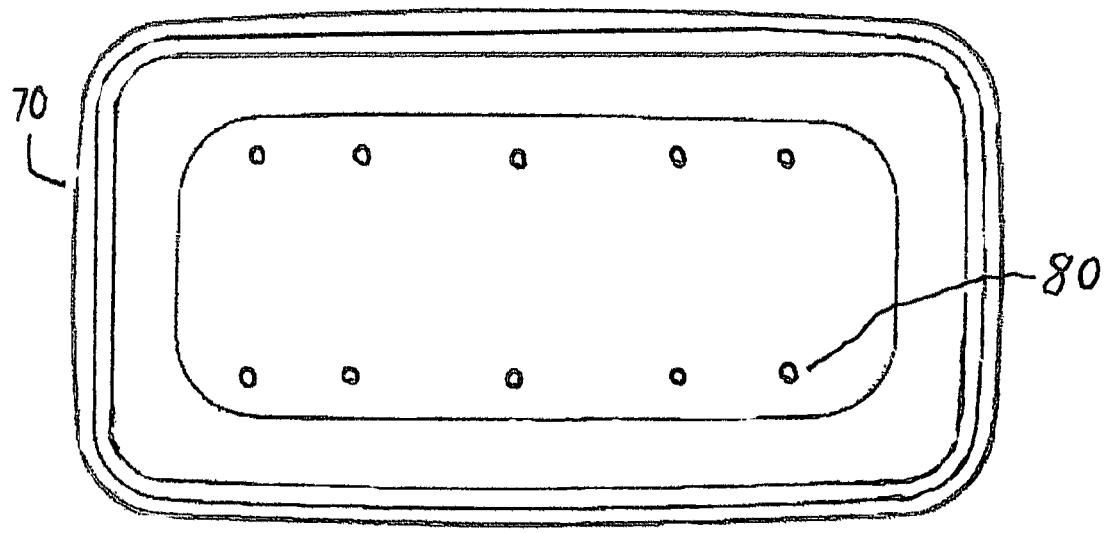
FIG. 8 is a top view of a typical cast-iron loaf pan according to the present invention.

FIG. 2 illustrates a typical cast-iron griddle pan 10 with apertures 20 in the cooking area. FIG. 4 illustrates a typical cast-iron skillet 30 with the apertures 40 in the cooking area. FIG. 6 illustrates a typical cast-iron flat griddle 50 with the apertures 60 in the cooking area. FIG. 8 illustrates a typical cast-iron loaf pan 70 with apertures 80 in the cooking area. FIG. 10 illustrates the second embodiment, a typical charcoal or gas grill 90, with the alternative cast-iron cooking surface with apertures 100 in the cooking surface.

As discussed earlier in the "SUMMARY OF THE INVENTION" the manufacturing process is quite simple and inexpensive. One can simply drill the apertures into the surface of the cast-iron cooking area. A more desirable, and most likely anticipated, manufacturing method is to mold the apertures into the cooking surface during the casting process.

To use the cookware apparatuses of the main embodiment in FIG. 2, 4, or 6 you simply place the cookware on the grill rack of a typical charcoal or gas grill. The first embodiment can also be used with other heat sources, such as a campfire or a RV park or state park style public grill. To use the cast-iron loaf pan apparatus in FIG. 8 simply use the loaf pan in conjunction with a grease catch pan and place it in the oven. To use the second embodiment, FIG. 10 cast-iron cooking surface for a typical charcoal or gas grill, you simply use this embodiment in place of a typical traditional grill rack. The second embodiment is designed with the purpose of taking the place of a typical grill rack on a typical charcoal or gas grill.

I claim:

1. A method of cooking meat comprising:

providing a heat source;

providing a cooking surface having a total cooking surface area, the cooking surface comprising a flat, cast-iron plate having a plurality of small apertures therethrough defining an aperture area, with the small apertures each having a diameter of 3/16 inch and spaced 2-3 inches apart to define a low ratio of aperture area to total cooking surface area;

placing the cooking surface over the heat source in order to heat the cooking surface;

placing the meat on the heated cooking surface;

cooking the meat on the heated cooking surface such that the cooking meat releases liquid fat and juices;

allowing for some, but not all, of the liquid fat and juices to drain through the small apertures thereby creating a searing effect on the meat and without creating a boiling effect on the liquid fat and juices; and having the low ratio of aperture area to total cooking surface area be such that the cooking meat is greatly shielded from direct heat from the heat source and the cooking meat producing few carcinogens.

* * * * *